Figure 1:
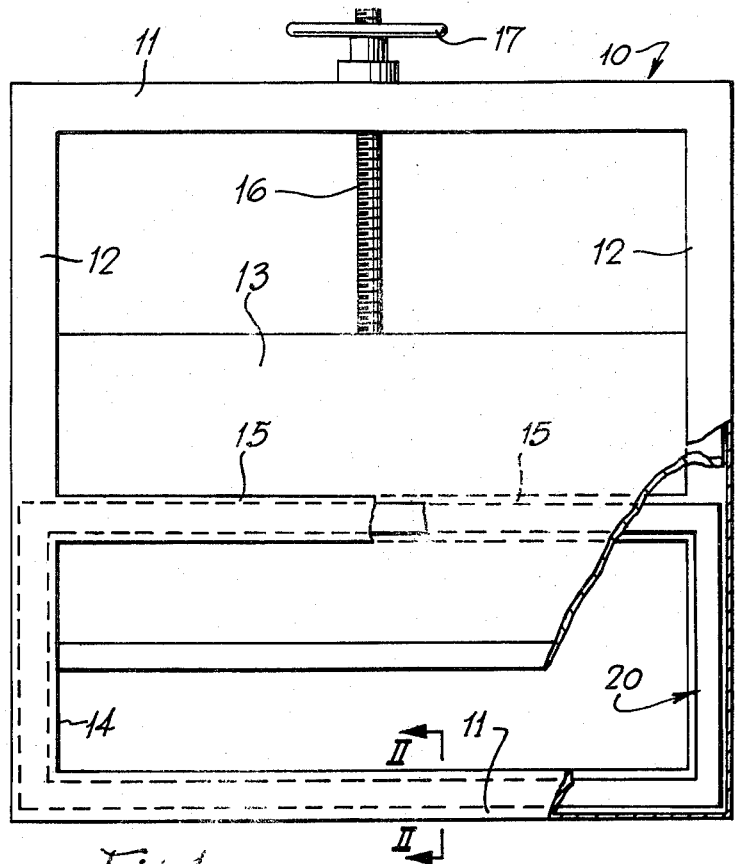

United States Patent [19]

McBain et al.

[11] 3,897,043
[45] July 29, 1975

[54] FLUID FLOW CONTROL VALVES

[75] Inventors: Charles McBain, Stratford-on-Avon; Francis Richard Need, Smethwick, both of England

[73] Assignee: Coplastix Limited, Cheshire, England

[22] Filed: Apr. 19, 1974

[21] Appl. No.: 462,409

[52] U.S. Cl. ............................. 251/328; 251/368
[51] Int. Cl. .............................................. F16k 3/02
[58] Field of Search ............ 251/328, 359, 358, 368

[56] References Cited
UNITED STATES PATENTS

| | | | |
|---|---|---|---|
| 3,118,467 | 1/1964 | Kuhn | 251/368 X |
| 3,333,816 | 8/1967 | Williams et al. | 251/328 X |
| 3,401,915 | 9/1968 | Kim | 251/328 X |

Primary Examiner—Arnold Rosenthal
Attorney, Agent, or Firm—Norris & Bateman

[57] ABSTRACT

A penstock valve having a sliding closure member slidable across an opening within a frame to control the flow of liquid therethrough, a seal being provided between adjacent co-operating surfaces of the frame and the closure member respectively, the seal consisting of a resilient portion bonded to one surface, and a bearing portion bonded to the resilient portion and adapted slidably to engage the other surface, a rigid insert being provided between the bearing portion and the surface to which the resilient portion is fixed thus to limit the maximum movement of the bearing portion causing compression of the resilient portion.

12 Claims, 2 Drawing Figures

PATENTED JUL 29 1975

3,897,043

FLUID FLOW CONTROL VALVES

This invention concerns fluid flow control valves and more particularly sealing means therefor, and is especially concerned with penstock valves of the type comprising a sliding closure member slidable across an opening to control the flow of fluid therethrough. The term 'valve of the type referred to' is to be construed herein as denoting a valve of the aforesaid type.

Valves of the type referred to usually include a sealing means arranged in strip form between the closure member (when closed) and a frame surrounding said opening, in which said closure member is arranged to slide. The sealing means may comprise a portion of the resilient material bonded to one of the co-operating surface portions of said closure member and said frame respectively, and a bearing portion bonded to said resilient portion and thus adapted to bear on the other side surface portions and having a lower coefficient of friction, with respect to said other surface portion than the resilient portion, whereby said bearing portion is arranged to slide on said other surface portion as the closure member is moved between its closed and open positions in operation of the valve.

A problem sometimes experienced with this type of sealing member arrangement accrues from the fact that, if the closure member remains in its closed condition for long periods during which the pressure of fluid on the upstream side of the valve causes the resilient portion of the seal to remain in a compressed state, there is a tendency for the resilient portion to become permanently deformed. Therefore, when the closure member is opened the resilient portion does not return to its original relaxed state. This can result in the seal becoming ineffective, which results in leakage between the closure member and the frame when the valve is closed, and particularly when fluid pressure is exerted on the closure member in a direction opposite to that normally experienced by the valve.

An object of the present invention is therefore to provide a valve of the type referred to having a sealing arrangement wherein the aforementioned problem is overcome or at least alleviated.

Thus, according to the present invention there is provided a valve comprising a sliding closure member slidable across an opening defined within a frame to control the flow of liquid through said opening, and a seal arranged between co-operating surface portions of said frame and said closure member respectively, said seal comprising a portion of resilient material bonded to one of said surface portions, and a bearing portion bonded to said resilient portion and adapted to bear on said other surface portion thus to slide thereon as the closure member is moved between its closed and open positions in operation of the valve, characterised in that a rigid insert is disposed between said bearing portion and the surface portion to which said resilient portion is bonded, whose thickness is less than that of said resilient portion, and adapted thus to limit the maximum compression of the resilient portion when the valve is closed.

Figure 2:
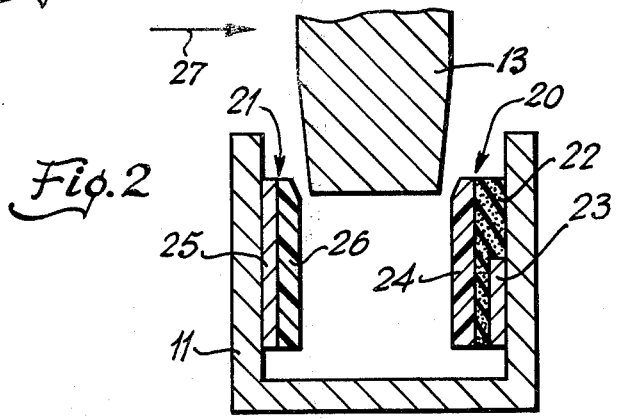

An embodiment of the invention will now be described, by way of example only, with reference to the accompanying drawings, in which:

FIG. 1 is a schematic elevation of a valve of the type referred to;

and FIG. 2 is a section taken on line II—II of FIG. 1, but with the closure member in an almost closed condition.

The valve comprises a frame generally indicated at 10 having horizontal and vertical frame members 11 and 12 respectively. The frame is of channel construction such that a closure member 13 may slide vertically within same and is thus adapted selectively to pass across an opening 14 defined by the base and lower side regions of the frame, and a pair of cross members 15 arranged one on each side of the closure member and connected at their ends respectively with the side members 12 of the frame.

The closure member 13 is adapted to be raised and lowered by means of a conventional threaded rod 16 and handwheel 17. The handwheel may of course be replaced by an automotive device if required.

A sealing arrangement generally indicated at 20 is attached to the frame members around the opening 14 on one side of the closure member 13. On the other side a further sealing arrangement 21 (see FIG. 2) is provided. The construction and purpose of these sealing arrangements will now be described in detail.

The sealing arrangement 20 which extends in strip form around the peripheral region of the opening 14, includes in cross-section a portion 22 of resilient material such as a closed cell, non-absorbent plastics or rubber foamed material selected according to the conditions which it must withstand in use, for example nitrile or neoprene rubber. The resilient portion 22 is bonded to its associated part of the frame and includes an insert 23 of metal or other non-resilient and rigid material whose thickness is less than that of the resilient portion 22 and which is disposed in an under-cut region thereof. The insert 23 may be welded or bonded to adjacent surface portions of the frame and the resilient portion 22 respectively, as appropriate. In practise the thickness of the insert 23 is approximately half of that of the portion 22.

The sealing arrangement 20 also includes a bearing portion 24 bonded to the face of the portion 22 remote from the adjacent frame member, and comprising a flexible but non-resilient material having lower frictional properties than the portion 22. This material is preferably non-absorbent and wear resistant, for example to abrasion by grit or the like, such as medium density higher molecular weight polyethylene.

The sealing arrangement 21 also extending in strip form around the peripheral region of the opening 14 and disposed on the opposite side thereof to the arrangement 20 and facing same, comprises in cross-section a rigid portion 25 of metal or other non-resilient material welded or bonded to the adjacent surface portion of the frame, and a bearing portion 26 bonded to the outer face of the portion 25 and of similar material to the portion 24 of the sealing arrangement 20.

The co-operating leading edges of the bearing portions 24 and 26, and the closure member 13 are chamfered for ease of introduction of the latter between the sealing arrangements 20 and 21 when the valve is moving towards a closed condition.

In use, as the closure member 13 passes across the opening 14 it is caused to slide upon the bearing portions 24 and 26 of the sealing arrangements 20 and 21 respectively. In order for the closure member to pass between said bearing portions 24 and 26 it is necessary for the resilient portion 22 of the sealing arrangement 20 to become at least partially compressed. Preferably, the degree by which the portion 22 is compressed is less than that required for the bearing portion 24 to compress completely that part of the portion 22 between the bearing portion 24 and the rigid insert 23.

The valve is arranged in use such that when the closure member 13 is raised above the opening 14 fluid can flow through the latter in the direction of the arrow 27 (FIG. 2). Therefore, when the closure member is lowered completely to occlued the opening 14 the resistance created by the resilient portion 22 preventing the closure member 13 from being displaced in the direction of the arrow 27 presents a firm seal, and the rigid insert 23 prevents the resilient portion 22 from becoming permanently deformed and thus ineffective. Thus, when the valve is closed a complete seal is ensured, even in the event of fluid pressure being applied in the reverse direction.

It is not intended to limit the invention to the above example alone, many variations such as might readily occur to one skilled in the art being possible without departing from the scope of the invention.

For example, the sealing arrangement 21 may in some applications be identical in construction with the sealing arrangement 20, particularly where it is necessary to provide an effective seal against flow in either direction through the valve.

What is claimed is:

1. A valve comprising a sliding closure member slidable across an opening defined within a frame to control the flow of liquid through said opening, and a seal arranged between co-operating surface portions of said frame and said closure member respectively, said seal comprising a portion of resilient material bonded to one of said surface portions, and a bearing portion bonded to said resilient portion and adapted to bear on said other surface portion thus to slide thereon as the closure member is moved between its closed and open positions in operation of the valve, characterized in that a rigid insert is disposed between said bearing portion and the surface portion to which said resilient portion is bonded, whose thickness is less than that of said resilient portion, and adapted thus to limit the maximum compression of the resilient portion when the valve is closed, and said bearing portion has a lower coefficient of friction than said resilient portion, with respect to said other surface portion.

2. A valve according to claim 1, wherein said rigid insert is disposed in an under-cut region of said resilient portion.

3. A valve according to claim 1, wherein said rigid insert has a thickness approximately half of that of said resilient portion.

4. A valve according to claim 1, wherein said resilient portion is bonded to said frame, said bearing portion slidably engaging said closure member during movement thereof.

5. A valve according to claim 1, wherein said rigid insert is bonded to said frame and to said resilient portion.

6. A valve according to claim 1, wherein said resilient portion is of a closed cell foamed material.

7. A valve according to claim 1, wherein said resilient portion is of a nitrile rubber foam.

8. A valve according to claim 1, wherein said bearing portion is of a flexible substantially non-resilient material such as medium density high molecular weight polyethelene.

9. A valve according to claim 1, wherein said bearing portion has a chamfered edge to facilitate introduction of said closure member into a closed position.

10. A valve according to claim 1, wherein said seal is provided between both sides of said closure member and co-operating portions of said frame respectively.

11. A valve according to claim 1, wherein said seal extends in strip form around the peripheral region of said opening.

12. A valve according to claim 1, wherein said seal is provided between one side of said closure member and co-operating adjacent surface portions of said frame, a further seal being provided on the opposite side of said closure member and comprising a rigid portion attached to one of the co-operating surfaces on said opposite side, and a bearing portion bonded to said rigid portion and adapted to bear upon the other of said co-operating surfaces thus to slide thereon as the closure member is moved between its closed and open positions in operation of the valve.

* * * * *

UNITED STATES PATENT AND TRADEMARK OFFICE
CERTIFICATE OF CORRECTION

PATENT NO. : 3,897,043
DATED : July 29, 1975
INVENTOR(S) : Charles McBain et al

It is certified that error appears in the above-identified patent and that said Letters Patent are hereby corrected as shown below:

On the first page of the patent, insert after line 21, the following:

-- Foreign Application Priority Data

May 2, 1973    Great Britain    20941/73 --

Signed and Sealed this thirteenth Day of April 1976

[SEAL]

Attest:

RUTH C. MASON
*Attesting Officer*

C. MARSHALL DANN
*Commissioner of Patents and Trademarks*